(12) United States Patent
Huang et al.

(10) Patent No.: US 8,721,998 B2
(45) Date of Patent: May 13, 2014

(54) USE OF MG(HCO3)2 AND/OR CA(HCO3)2 AQUEOUS SOLUTION IN METAL EXTRACTIVE SEPARATION AND PURIFICATION

(75) Inventors: Xiaowei Huang, Beijing (CN); Zhiqi Long, Beijing (CN); Xinlin Peng, Beijing (CN); Hongwei Li, Beijing (CN); Guilin Yang, Beijing (CN); Dali Cui, Beijing (CN); Chunmei Wang, Beijing (CN); Na Zhao, Beijing (CN); Liangshi Wang, Beijing (CN); Ying Yu, Beijing (CN)

(73) Assignee: Grirem Advanced Materials Co., Ltd., Beijing (CN)

( * ) Notice: Subject to any disclaimer, the term of this patent is extended or adjusted under 35 U.S.C. 154(b) by 277 days.

(21) Appl. No.: 13/143,772

(22) PCT Filed: Jan. 14, 2010

(86) PCT No.: PCT/CN2010/070182
§ 371 (c)(1),
(2), (4) Date: Jul. 8, 2011

(87) PCT Pub. No.: WO2010/081418
PCT Pub. Date: Jul. 22, 2010

(65) Prior Publication Data
US 2011/0274597 A1    Nov. 10, 2011

(30) Foreign Application Priority Data

Jan. 15, 2009 (CN) .......................... 2009 1 0076956
Mar. 11, 2009 (CN) .......................... 2009 1 0118985

(51) Int. Cl.
*C01F 17/00* (2006.01)

(52) U.S. Cl.
USPC .............. 423/21.5; 423/24; 423/63; 423/100; 423/112

(58) Field of Classification Search
USPC ........................................................ 423/21.5
See application file for complete search history.

(56) References Cited

U.S. PATENT DOCUMENTS

| 2002/0053260 A1 | 5/2002 | Nakon |
| 2010/0003176 A1 | 1/2010 | Huang et al. |

FOREIGN PATENT DOCUMENTS

| CN | 101260466 A | 9/2008 |
| CN | 101319276 A | 12/2008 |

*Primary Examiner* — Melissa Stalder
(74) *Attorney, Agent, or Firm* — Birch, Stewart, Kolasch & Birch, LLP

(57) ABSTRACT

The application of aqueous solution of magnesium bicarbonate and/or calcium bicarbonate in the process of extraction separation and purification of metals is disclosed, wherein the aqueous solution of magnesium bicarbonate and/or calcium bicarbonate is used as an acidity balancing agent, in order to adjust the balancing pH value of the extraction separation process which uses an acidic organic extractant, improve the extraction capacity of organic phase, and increase the concentration of metal ions in the loaded organic phase.

25 Claims, 2 Drawing Sheets

USE OF MG(HCO3)2 AND/OR CA(HCO3)2 AQUEOUS SOLUTION IN METAL EXTRACTIVE SEPARATION AND PURIFICATION

TECHNICAL FIELD

The present invention relates to a use of aqueous solution of $Mg(HCO_3)_2$ or/and $Ca(HCO_3)_2$ in metal extractive separation and purification. Specifically, an acidic organic extractant, an aqueous solution of $Mg(HCO_3)_2$ or/and $Ca(HCO_3)_2$ and a solution of metal are mixed for preextraction, thereby producing a loaded organic phase containing metal ion, which is used for extractive separation and purification of metal solution. It belongs to the field of solvent extractive separation and purification.

BACKGROUND ART

Acidic organic extractant is the most widely used extractant in industry, and RE, Ni, Co, Fe, Al, Cu, Zn, Cr, V, etc. can be separated and purified by acidic solvent extraction. The most commonly used techniques include: saponification of extractant, such as P507(HEHEHP), P204(D2EHPA), C272 (DTMPPA), P229(HDEHP), C301(bis(2,4,4-trimethylpentyl) dithiophosphinic acid), C302(bis(2,4,4-trimethylpentyl) monothiophosphinic acid), naphthenic acid, isomeric acid, for extractive separation of rare earth in hydrochloride acid medium([1] symposium of rare earth chemistry, Changchun Institute of Applied Chemistry, 1982, science press.[2] Xu Guangxian, Rare Earth (the second edition (volume 1), metallurgical industry press, 2002, P542-547); Separation of all rare earths in ionic rare earth ore with moderate yttrium and rich europium (CN87101822); process of solvent extractive separation of mixed rare earth by ammoniated P507 (CN85102210); process of continuous saponification of organic phase (CN95117989.6); separation and purification of yttrium oxide in saponified naphthenic acid-hydrochloride system (Xu Guangxian, rare earth (the second edition, volume 1), metallurgical industry press, 2002, P582, 590). All above extractants used for separation and purification are acidic organic extractants, whose metal extraction ability (distribution ratio) has an reverse relationship with equilibrium acidity of aqueous phase. Generally, the extracted metal ion exchanges with the hydrogen ion of acidic organic extractant, and the latter transfers to aqueous phase, raises the pH value of aqueous phase and thus reduces the metal extraction ability (distribution ratio). Therefore, the extractant has to be saponified by ammonium solution or NaOH to remove the hydrogen ion in organic phase (see reaction equation 1), and then separates and purifies metal ion through exchange (see reaction equation 2). It can be seen that large amount of ammonium is consumed in the extractive separation process, which increases the cost, and moreover, large amount of ammonium-nitrogen waste water is produced and causes severe pollution to water resources. 0.6-1.0 ton of liquid ammonium is need for separation and purification of 1 ton of rare earth oxide. What's more, because the concentration of the ammonium-nitrogen waste water is low, the difficulty and cost of recovery is so high that enterprises are unable to accept it. How to get rid of the pollution of ammonium-nitrogen waste water to environment is a pressing difficult problem in current rare earth separation and purification industry.

$HA+NH_4^+=NH_4A+H^+$    reaction equation 1

$3NH_4A+M^{3+}=MA_3+3NH_4^+$    reaction equation 2

HA represents organic extractant and $M^{3+}$ represents trivalent metal ion.

In recent years, in order to avoid the pollution by ammonium-nitrogen waste water, some enterprises use NaOH instead of liquid ammonium for saponification of organic phase, which produces no ammonium-nitrogen waste water but large amount of sodium chloride waste water with high salinity, and doubles the saponification cost.

The Chinese invention patent application 200710163930.9 discloses the pretreating method of an organic extractant and its application technique, namely, size mixing of rare earth carbonate with water, or Ca and Mg contained alkaline earth metal ore with rare earth solution, to obtain a pretreated slurry. At certain temperature the organic extractant is pretreated, the rare earth ion in pulp is extracted into organic phase, and the obtained rare earth ion loaded organic phase is used for non-saponification separation of rare earth.

The Chinese invention patent application 200710187954.8 discloses a pretreating method of an organic extractant, product and its application technique. The organic extractant is directly mixed with rare earth solution and alkaline earth metal compound powder containing Mg and/or Ca, or with slurry (produced with water), for preextraction. The rare earth ion in aqueous phase is extracted into organic phase, the new born hydrogen ion dissolves the alkaline earth metal compound powder, and the obtained rare earth ion loaded organic phase is used for non-saponification separation of rare earth.

Both of the invention patents above use Ca and Mg contained alkaline earth metal minerals, or Mg and/or Ca alkaline earth metal compound powder or slurry, namely, the pretreatment or preextraction process of organic phase by Mg and/or Ca oxide, hydroxide, carbonate powder or slurry. Because the Ca and Mg contained alkaline earth metal minerals and its oxide and hydroxide product contains many impurities, such as Si, Fe, Al, etc. (generally with 2~4% Si, 0.5~1% Fe, and 0.3~0.5% Al), Fe, Al, etc. is easily extracted into organic phase and spoils the quality of the product; Si exists as oxide or silicate, so it stays stable and doesn't take part in the reaction. It still exists as solid which partially precipitates to the bottom of the extraction tank and is partially mixed in organic phase as the third phase. In addition, the solid-liquid reaction speed is low and incomplete, so it would also leave some solid substance which forms the third phase in the pretreatment or extraction process and thus hinders the extraction process. Adoption high grade alkaline earth metal minerals with less impurity will increase the production cost greatly and thus make the operation of the enterprises impossible.

Contents of Invention

One purpose of the invention is to provide a use of aqueous solution of $Mg(HCO_3)_2$ and/or $Ca(HCO_3)_2$ in extractive separation and purification of metals with acidic extractant; the second purpose is to provide a new process of directed extractive separation and purification of metal by organic extractant with low cost and without discharge of ammonium-nitrogen waste water; and the third is to provide a preparation method of $Mg(HCO_3)_2$ and/or $Ca(HCO_3)_2$ solution.

According to the characteristics of acidic organic extractants such as P507, P204, C272, P229, C301, C302, naphthenic acid, isomeric acid, etc., the invention studies the application of $Mg(HCO_3)_2$ and/or $Ca(HCO_3)_2$ in metal extractive separation and purification. Acidic organic extractant, aqueous solution of $Mg(HCO_3)_2$ or/and $Ca(HCO_3)_2$, and metal solution are added into extraction tank step by step or simultaneously for pretreatment. Metal ion is extracted into organic phase, and after clarification, a loaded organic phase containing metal ion that is hard to extract is obtained. The loaded organic phase is then used to exchange with metal ion that is easy to extract during the extractive separation and purification process of metal elements. After several stages of extractive separation and purification the metal ion that is hard to extract is separated from meal ion that is easy to extract. Basic reaction equations are as follows:

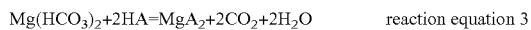

$$Mg(HCO_3)_2 + 2HA = MgA_2 + 2CO_2 + 2H_2O \qquad \text{reaction equation 3}$$

$$3MgA_2 + 2M_a{}^{3+} = 2M_aA_3 + 3Mg^{2+} \qquad \text{reaction equation 4}$$

$$M_aA_3 + M_b{}^{3+} = M_bA_3 + M_a{}^{3+} \qquad \text{reaction equation 5}$$

Ma represents metal ion that is difficult to extract, and Mb represents metal ion that is easy to extract.

Mg or/and Ca ion transfers into aqueous phase in the pretreatment process and basically do not enter the extractive separation and purification process with organic phase, which keeps the equilibrium acidity of aqueous phase stable in extraction process and concentration of alkaline earth metals in metal products low.

The aqueous solution of magnesium bicarbonate and/or calcium bicarbonate, used by the invention as acidity balancing agent, adjusts the balancing pH value of the metal extractive separation and purification process which uses an acidic organic extractant, improves the metal extraction capacity of organic phase, and increases the concentration of metal ion in the loaded organic phase, namely, acidic organic extractants such as P507, P204, C272, P229, C301, C302, naphthenic acid, isomeric acid, etc., aqueous solution of $Mg(HCO_3)_2$ or/and $Ca(HCO_3)_2$, and metal solution is mixed step by step or simultaneously for preextraction. Metal ions are extracted into organic phase quantitatively, and after clarification a loaded organic phase containing metal ions is obtained. The loaded organic phase are then used for extractive separation and purification process of many metal solutions, and after several stages of extractive separation and purification, single metal compound or an enriched substance of several metals is obtained.

In the invention, cheap minerals such as magnesite, limestone, calcite, dolomite are calcined and then mixed for digestion, or $Mg(OH)_2$ or/and CaO is mixed for digestion, or $Mg(OH)^2$ or/and $Ca(OH)_2$ is directly mixed with water (raw materials above contain 2~4% of Si, 0.5~1% of Fe, and 0.3~0.5% of Al), after which slurry is carbonized by $CO_2$ gas and aqueous solution of $Mg(HCO_3)_2$ or/and $Ca(HCO_3)_2$ is obtained; or magnesium salt is used as raw materials for preparation of $Mg(OH)_2$ which is mixed for digestion with water and carbonized to obtain $Mg(HCO_3)_2$ solution. The $Mg(HCO_3)_2$ solution is then filtered to remove the impurities such as Si, Fe, Al, etc. and get a pure solution of $Mg(HCO_3)_2$ or/and $Ca(HCO_3)_2$ with both of Fe and Al less than 5 ppm. The pure solution, acidic organic extractant, and metal solution are then mixed for preextraction. Compared with patents above, the invention has the following advantages: (1) no third phase is formed during preextraction or extractive separation and purification process, and it doesn't introduce impurities such as Fe, Al, Si, etc., which can ensure the quality of the product. (2) $Mg(HCO_3)_2$ or/and $Ca(HCO_3)_2$ is used to accurately control the equilibrium pH value of the metal extraction process, the recovery rate of rare earth is high, the liquid-liquid reaction is faster than liquid-solid reaction, the extraction of metal is more complete and flow speed of liquid slurry is much easier to be accurately controlled than that of solid slurry. (3) Raw minerals of Ca and Mg or low grade oxide and hydroxide are directly used as raw materials. In the carbonization process Mg and Ca are changed into liquid, while impurities such as Si, Fe, Al, etc. are left in slag and removed by filtration. Therefore, there is no high requirement to the quality of raw materials of Ca or Mg, and the cost of raw materials is reduced greatly. In addition, the Mg contained aqueous raffinate from the pretreatment of organic phase is transformed by alkaline for the preparation of $Mg(OH)_2$ which is returned for the preparation of $Mg(HCO_3)_2$ by carbonization. The $CO_2$ from the reaction between $Mg(HCO_3)_2$ or/and hydrogen ion in pretreatment process, from the calcination of metal carbonate and metal oxalate, and from boiler can be caught and used for preparation of $Mg(HCO_3)_2$ or/and $Ca(HCO_3)_2$ by carbonization. Therefore, the resources are effectively recycled, the pollution of $CO_2$ gas and waste water is evaded and moreover, the production cost of metal is reduced greatly.

The specific technical solution of the present invention are as follows:

A use of aqueous solution of magnesium bicarbonate and/or calcium bicarbonate in the process of extractive separation and purification of metals is disclosed in the present invention.

A use of aqueous solution of magnesium bicarbonate and/or calcium bicarbonate in the process of extractive separation and purification of metals is to use the aqueous solution of magnesium bicarbonate and/or calcium bicarbonate as an acidity balancing agent in the extractive separation and purification process which uses an acidic organic extractant.

The process of extractive separation and purification includes the following steps: (1) the acidic organic extractant, the aqueous solution of magnesium bicarbonate and/or calcium bicarbonate and a metal solution with the metal ion to be separated and purified are added into extraction tank step by step or simultaneously, and then a preextraction is realized in single or multiple stage concurrent and/or countercurrent way, during which the metal ion in aqueous phase is extracted into the organic phase. Equilibrium pH value of the aqueous phase is 1-6, an organic phase loaded with metal ion as well as aqueous phase loaded with magnesium and/or calcium ion are obtained; (2) the obtained organic phase loaded with metal ion is used for extractive separation and purification of metal solution containing 2 or more species of metal ions which includes the ones contained in the organic phase. After multi-stage extraction, washing and stripping process, the difficulty-extracted metal ion enter into the raffinate solution, while the easily-extracted ones enter into the stripping solution, thus a raffinate solution, a lotion and a stripping solution products with different metal ions are obtained; alternatively, the obtained organic phase loaded with metal ions is extracted directly by acid or alkali solution to obtain purified metal solution or slurry. The solution is used to produce metal compounds product by concentration crystallization or precipitation, or to produce single metal compound product by further extraction, while the slurry is used to produce compound product by filtration.

The optimized process of extractive separation and purification is as follows:

(1) The acidic organic extractant and the aqueous solution of magnesium bicarbonate and/or calcium bicarbonate is added into extraction tank simultaneously, and then a extraction is realized in single or multiple stage concurrent and/or countercurrent way, during which magnesium and/or calcium ion exchanges with hydrogen ion in the organic phase. Equilibrium pH value of the aqueous phase is 3~5. After clarification and phase separation, a magnesium and/or calcium ion-containing organic phase and a waste water are obtained; then the magnesium and/or calcium ion contained organic phase is mixed with a metal solution containing the metal ion to be separated and purified to realize preextraction in single stage or multi stage concurrent and/or countercurrent way, during which the metal ion is extracted into the organic phase. After clarification and phase separation, metal ion loaded organic phase and aqueous phase loaded with magnesium and/or calcium ion. Equilibrium pH value of the aqueous phase is 2.5~4.5.

(2) The obtained organic phase loaded with metal ion is used for extractive separation and purification of metal solution containing 2 or more species of metal ion which include the ones contained in organic phase. After multistage extraction, scrubbing and stripping process, the difficultly-extracted metal ion enter into the raffinate solution, while the easily-extracted ones enter into the stripping solution, then a raffinate solution, a lotion and stripping solution products with different metal ion are obtained.

Alternatively, the obtained organic phase loaded with metal ions is stripped directly by acid or alkali solution to obtain purified metal solution or slurry. The solution is used to produce metal compound product after concentrating crystallization or precipitation, or to produce single metal compound product by further extraction, while the slurry is used to produce compound product through filtration.

The metal ions in the technique solutions are at least one selected from the group consisting of Lanthanum, Cerium, Praseodymium, Neodymium, Samarium, Europium, Gadolinium, Terbium, Dysprosium, Holmium, Erbium, Thulium, Ytterbium, Lutetium, Yttrium, Nickel, Cobalt, Iron, Manganese, Chromium, Aluminum, Vanadium, Copper and Zinc. The commonly used metal elements are at least one selected from the group consisting of Lanthanum, Cerium, Praseodymium, Neodymium, Samarium, Europium, Gadolinium, Terbium, Dysprosium, Holmium, Erbium, Thulium, Ytterbium, Lutetium and Yttrium.

The acidic extractant in the technique solutions comprises of single or mixed extractants selected from acidic phosphorous extractant and carboxylic acid extractant, wherein the extractant is diluted by organic solvent, and the concentration of extractant is 0.5~2.0 mol·L$^{-1}$. The stated acidic extractant is single or mixed system whose components are selected from the group consisting of P507, P204, P229, C272, C301, C302, fatty acid, naphthenic acid and heterogeneous acid.

The content of magnesium oxide and/or calcium oxide in said aqueous solution of magnesium bicarbonate and/or calcium bicarbonate is 5~100 g/L, wherein the optimal content is 5~30 g/L. The contents of iron and aluminum are less than 5 ppm, respectively, while the optimal result for both is less than 2 ppm.

Single stage or 2-20 stages concurrent and/or countercurrent extraction is used in said extraction of step (1), during which the volume flow ratio or phase ratio of the organic phase to aqueous phase (including metal solution, aqueous solution of magnesium bicarbonate and/or calcium bicarbonate, and other aqueous solution) is 0.2~10:1 (O/A), with single stage mixing time: 3~30 minutes and clarifying time: 5~60 minutes. The temperature in the extraction tank is 20~50° C., the total concentration of metal ions in the loaded organic phase is 0.05~0.3 mol/L and equilibrium pH value of the raffinate aqueous phase containing magnesium or/and calcium ions is 2.5~4.5. There are two ways to mix organic phase and aqueous phase: one is that organic phase and magnesium bicarbonate and/or calcium bicarbonate is mixed thoroughly at first and then mixed with metal ions solution, and the other is that organic phase, magnesium bicarbonate and/or calcium bicarbonate, and metal ions solution is mixed directly.

In the step (1) of the optimized process, 1 to 1.5 mol/L acidic extractant and an aqueous solution of magnesium bicarbonate and/or calcium bicarbonate saturated with carbon dioxide is mixed to realize extraction in single stage or 2-10 stages concurrent and/or countercurrent way, during which the volume ratio of the organic phase to aqueous phase (O/A) is 0.2~10:1, with single-stage mixing time 3~30 minutes and clarifying time 5~30 minutes. An loaded organic phase with 0.15 to 0.3 mol/L magnesium and/or calcium ions and waste water whose pH value is 2.5~4.5 is obtained. The waste water is returned for the carbonization process. Then single stage or 2~10 stages concurrent and/or countercurrent way is used in the extraction reaction between the organic phase loaded with magnesium and/or calcium ions and 0.1~2.0 mol/L metal solution, during which the volume ratio of the organic phase to aqueous phase (O/A) is 0.2~10:1, with single stage mixing time 3~30 minutes and clarifying time 5~30 minutes. Metal ions are extracted into organic phase, and after clarification, a loaded organic phase containing 0.1~0.2 mol/L metal ions and a raffinate aqueous phase containing magnesium or/and calcium ions with pH value 2.5~4.5 is obtained. The 0.1~2.0 mol/L metal solution is the raffinate in the process of extractive separation and purification of step (2). The temperature in the extraction tank is controlled at 20~50° C.

The loaded organic phase of step (2) is used for extractive separation and purification of metal solution containing 2 or more species of metal ions, during which 10~150 stages fractional extraction is used, while 3~20 stages concurrent and/or countercurrent way is used for stripping. The volume ratio of the organic phase to aqueous phase (O/A) is 0.1~10:1, with single stage mixing time 3~20 minutes and clarifying time 5~30 minutes. The temperature in the extraction tank is controlled at 20~80° C.

Said metal solution is chloride solution, nitrate solution, sulphate solution or a mixture thereof, with metal concentration of 0.1~1.8 mol/L.

The carbon dioxide which released from reaction between the acidic organic extractant and the aqueous solution of magnesium bicarbonate and/or calcium bicarbonate of step (1) is collected and returned for the preparation of the aqueous solution of magnesium bicarbonate and/or calcium bicarbonate.

One method of preparation of the aqueous solution of magnesium bicarbonate and/or calcium bicarbonate in the technical solution is to calcine, digest and carbonize magnesium or/and calcium minerals which are at least one selected from the group consisting of magnesite, dolomite, magnesium carbonate and other minerals.

The roasting process of magnesium or/and calcium minerals is that the minerals are roasted for 1~5 hours at 700~1000° C. The process of digestion is that water is added into magnesium oxide and/or calcium oxide obtained after roasting to digest at 50~95° C., for 0.5~5 hours, according to the weight ratio of the liquid to solid: 1~5:1 (calculated by the weight of water and magnesium oxide and/or calcium oxide), and then water is added to form slurry based on the weight ratio of the liquid to solid: 10~200:1 (calculated by weight of water and magnesium oxide and/or calcium oxide). The process of carbonization is that the slurry is carbonized by carbon dioxide gas after digestion, with reaction temperature controlled at 0~50° C. and reaction time 0.1~5 hours. Pure aqueous solution of magnesium bicarbonate and/or calcium bicarbonate is obtained by filtration.

The second method of preparation of the aqueous solution of magnesium bicarbonate in technical solution is to add water to magnesium oxide to digest at 50~95° C. for 0.5~5 hours, with the weight ratio of the liquid to solid: 1~5:1 (calculated by the weight of water and magnesium oxide). Water is added to form slurry or magnesium hydroxide and water is mixed directly based on the weight ratio of the liquid to solid: 10~200:1 (calculated by weight of water and magnesium oxide and/or calcium oxide). Then the slurry is carbonized by carbon dioxide gas, with reaction temperature controlled at 0~50° C. and reaction time 0.1~5 hour. Pure aqueous solution of magnesium bicarbonate is obtained by filtration.

The third method of preparation of the aqueous solution of magnesium bicarbonate in the technical solution is to use a magnesium salt as raw material for the preparation of solution of magnesium bicarbonate, and the specific steps are:

Preparation of magnesium hydroxide: the magnesium salt solution or solid magnesium salt is dissolved in water, then liquid or solid alkaline compound whose alkalinity is stronger than that of magnesium hydroxide is added, and after reaction, magnesium hydroxide slurry is obtained, or magnesium hydroxide filter cake is obtained by filtration.

Preparation of aqueous solution of magnesium bicarbonate: the magnesium hydroxide slurry or magnesium hydroxide filter cake obtained from step (1) is mixed with water and then carbonized by carbon dioxide gas to generate an aqueous solution of magnesium bicarbonate.

Said magnesium salt in step (1) is at least one selected from magnesium chloride and magnesium nitrate, and the concentration thereof is 10~300 g/L (calculated by magnesium oxide).

Said magnesium salt solution in step (1) is at least one selected from the group consisting of raffinate aqueous phase containing magnesium chloride and magnesium nitrate obtained from the process of extractive separation and purification, brine and seawater, and the concentration thereof is 10~200 g/L (calculated by magnesium oxide).

Said alkaline compound in step (1) is at least one selected from the group consisting of calcium hydroxide, sodium hydroxide, potassium hydroxide, calcium hydroxide obtained from calcium oxide by digestion, and a mixture of calcium hydroxide and magnesium hydroxide obtained from light burnt dolomite by digestion.

Said alkaline compound in step (1) is calcium hydroxide obtained from calcium oxide by digestion or a mixture of calcium hydroxide and magnesium hydroxide obtained from light burnt dolomite by digestion.

The amount of the alkaline compound added in step (1) is 1~1.5 times of the theoretical stoichiometric amount. The reaction temperature is 15~95° C., and the reaction time is 10~180 mins.

During the process of mixing magnesium hydroxide slurry or magnesium hydroxide filter cake with water, the weight ratio of the liquid to solid is 10~200:1 (calculated by weight of water and magnesium oxide). The reaction temperature is controlled at 0~35° C. in the process of continuous carbonation by carbon dioxide gas, and a pure aqueous solution of magnesium bicarbonate is obtained by filtration.

The method of preparation of the aqueous solution of magnesium bicarbonate is that at least one selected from the group consisting of calcium carbonate, limestone, marble and dolomite is sprayed by water and carbonized by carbon dioxide gas, and then a pure aqueous solution of magnesium bicarbonate is obtained by filtration.

Advantageous Effects of the Present Invention

The aqueous solution of magnesium bicarbonate and/or calcium bicarbonate is used as acidity balancing agent in the present invention, to adjust the balancing pH value of the metal extractive separation and purification process which uses an acidic organic extractant, improve the metal extraction capacity of organic phase, and increase the concentration of metal ions in the loaded organic phase, namely, acidic organic extractants such as P507, P204, C272, P229, C301, C302, naphthenic acid, isomeric acid, etc., aqueous solution of magnesium bicarbonate and/or calcium bicarbonate, and metal solution are mixed step by step or simultaneously for preextraction. Metal ions are extracted into organic phase quantitatively, and after clarification, a loaded organic phase containing metal ions is obtained. The loaded organic phase are then used for extractive separation and purification process of many metal solutions, and after several stages of extractive separation and purification, single metal compound or enrichment of several metals is obtained. The used aqueous solution of magnesium bicarbonate and/or calcium bicarbonate is prepared by digestion and carbonization after roasting magnesium or/and calcium minerals such magnesite, dolomite or magnesium carbonate and other minerals, or mixing the magnesium hydroxide slurry with magnesium salt as raw material and carbonization, or spraying water to at least one selected from the group consisting of calcium carbonate, limestone, marble and dolomite are and carbonization, wherein the content of impurities such as silicon, iron, aluminum, etc. is low, with no high requirements to the purity of raw materials of calcium/magnesium and low material cost. No third phase is formed during preextraction and extraction separation and purification process, which can ensure the quality of the product. In addition there is no need for organic extractant to be saponificated by ammonia and thus no ammonia-nitrogen wastewater is produced, which can eliminate the pollution of ammonia-nitrogen wastewater to environment from the beginning, significantly reduce the cost of metal product and save a lot expense of disposing three wastes.

The main advantages of the invention are as follows: (1) the aqueous solution of high purity magnesium bicarbonate and/or calcium bicarbonate prepared by solid compounds of magnesium or/and calcium as raw materials is used for preextraction process of organic phase. No third phase is formed during preextraction and extractive separation and purification process, and no ammonia-nitrogen wastewater or high salinity wastewater is produced; (2) the aqueous solution of magnesium bicarbonate and/or calcium bicarbonate is used to accurately control the equilibrium pH value of the metal extraction process, which makes the extraction of metal more complete, thereby the recovery rate of rare earth is high and the flow speed is easy to be accurately controlled; (3) the magnesium contained aqueous raffinate and carbon dioxide gas from the preextraction process of organic phase and carbon dioxide gas from the calcination of metal carbonate and metal oxalate as well as boiler can be caught and used for preparation of aqueous solution of magnesium bicarbonate and/or calcium bicarbonatein. Therefore, the resources are effectively recycled to avoid the pollution of ammonia-nitrogen wastewater, high salinity wastewater and carbon dioxide gas; (4) it can save a lot cost of chemical materials and disposing wastewater, which significantly reduces the production cost of metal.

SPECIFIC MODE FOR CARRYING OUT THE INVENTION

Figure 1:
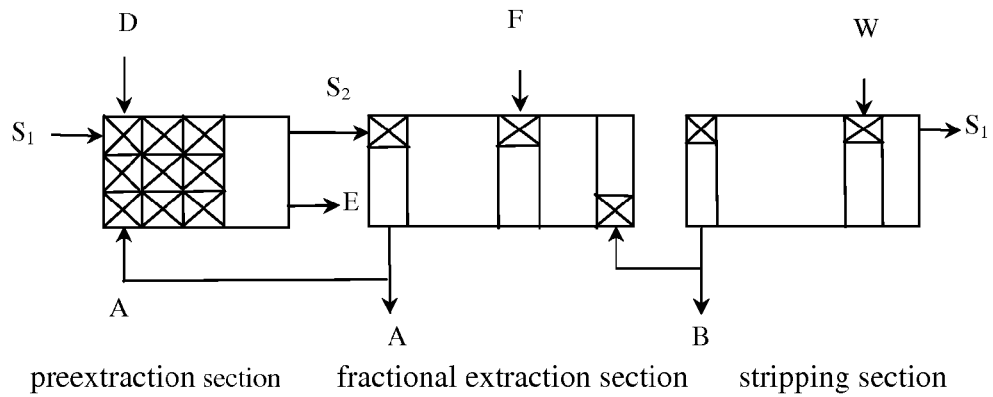
FIG. 1: the schematic diagram for the extraction process of example 1.
S1: loop organic phase P507
S2: loaded organic phase F: LaCePr rare earth chloride solution (metal solution)
D: aqueous solution of magnesium bicarbonate
E: $MgCl_2$ aqueous raffinate solution of the preextraction
A: raffinate $(LaCe)Cl_3$ solution
B: stripping liquor $PrCl_3$ solution
W: backwash acid hydrochloride solution
⊠: stirring
Figure 2:
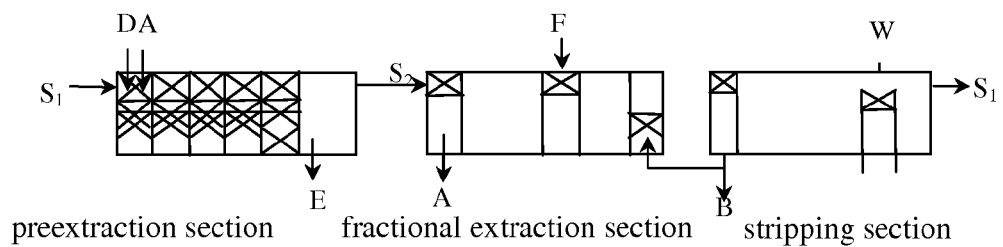
FIG. 2: the schematic diagram for the extraction process of the contrast example.
S1: loop organic phase P507
S2: loaded organic phase
F: LaCePr rare earth chloride solution (metal solution)
D: magnesia slurry
E: $MgCl_2$ aqueous raffinate solution of the preextraction
A: raffinate $(LaCe)Cl_3$
B: stripping liquor $PrCl_3$ solution
W: backwash acid hydrochloride solution
Figure 3:
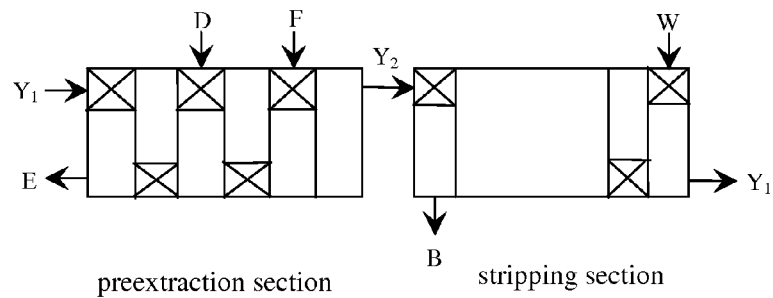
FIG. 3: the schematic diagram for the extraction progress of example 5
$Y_1$: loop organic phase 1.5M P204
$Y_2$: loaded organic phase
D: magnesium bicarbonate aqueous solution
F: liquid of rare earth LaCePrNd sulfate mixture
W: stripping acid
B: stripping liquor
E: aqueous raffinate
Figure 4:
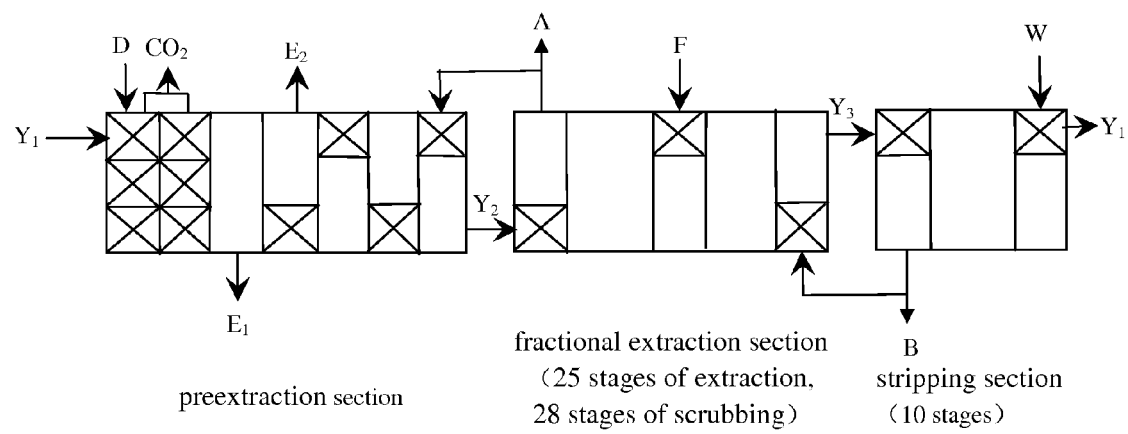
FIG. 4: the schematic diagram for the extraction process of example 10.
$Y_1$: loop organic phase
$Y_2$: loaded organic phase
$Y_3$: loaded organic phase
A: raffinate
B: stripping liquor
D: aqueous solution of magnesium bicarbonate
$E_1$: wastewater
$E_2$: aqueous raffinate
F: liquid of rare earth LaCePrNd sulfate mixture
W: stripping acid

The following examples shall is provided to further illustrate the methods and their application of the present invention. The protection scope of the invention is determined by the claims and should not be limited by these examples.

Example 1

The magnesite is calcined at 900-950° C. for 2 hours to get light burned magnesia (Si: 3.2%, Fe: 0.8%, Al: 0.4%). At 80° C., the magnesia is digested by water at liquid to solid ratio of 2:1 (calculated by the weight of water and magnesia) for 1 hour, and thereafter mixed with water at liquid to solid ratio of 60:1 (calculated by the weight of water and magnesia). Then carbon dioxide gas (70 vt %) is introduced into it and reacted for 2 hours at 15° C. After filtration, pure aqueous solution of magnesium bicarbonate (MgO: 15.1 g/L, Fe: 1.8 ppm, Al: 1.6 ppm) is obtained.

The above aqueous solution of magnesium bicarbonate, a raffinate of lanthanum chloride and cerium chloride (1.33 mol/L), and an organic phase of P507 (1.3 mol/L) are added into a 3-stage preextraction tank at the flow speed of 2.7 L/min, 0.5 L/min and 4 L/min, respectively, to be concurrent extracted with flow ratio (organic phase to aqueous phase): 4:3.2, mixing time: 30 mins, temperature in the preextraction tank: 45° C., and clarification time: 15 mins. An organic phase loaded with difficult-extracted rear earth lanthanum and cerium is obtained. The content of the rare earth (calculated by REO, the follows are the same) is 0.165 mol/L. And meanwhile, an aqueous raffinate of magnesium chloride, pH 3.5 and the content of REO less than 0.001 mol/L, is obtained. The aqueous raffinate of magnesium chloride are transformed by alkaline to produce magnesium hydroxide, then carbonized to produce magnesium bicarbonate which is returned to the preextraction process. The released carbon dioxide in the preextraction process is collected and returned to produce aqueous solution of magnesium bicarbonate by carbonization.

The loaded organic phase containing 0.165 mol/L of lanthanum and cerium is directly used for fractional extraction of mischmetal chloride solution (REO: 1.48 mol/L, Pr: 7.2%) containing La, Ce and Pr. The extraction flow ratio of organic phase to aqueous phase (volume ratio) is 2.2:1, mixing time of single stage is 4 mins, clarification time is 15 mins, and the temperature in the extraction tank is 30° C. A Stripping liquor of praseodymium chloride and a raffinate of lanthanum chloride and cerium chloride are obtained after 25 stages of extraction, 28 stages of scrubbing, and 7 stages of countercurrent back extraction by 5 mol/L hydrochloride solution and aqueous phase reflux back extraction. $Pr_6O_{11}$/REO, Fe, Al, and Mg in the solution of praseodymium chloride are 99.9%, 4.8 ppm, 3.7 ppm and 2.6 ppm, respectively. Concentration of REO, Fe and Al in the raffinate of lanthanum and cerium chloride are 1.33 mol/L, 2.5 ppm and 2.3 ppm, respectively. Part of the raffinate is used for the preextraction of organic phase, and another part of the raffinate is the product or used as raw materials for the separation of pure lanthanum and pure cerium.

After 10 days operation, there is no third phase or sediment in the preextraction and the fractional extraction process. The concentration of Fe in the back extracted organic phase is less than 0.001 mol/L.

Contrast Example (Slurry of Magnesium Oxide)

The magnesite is calcined at 900-950° C. for 2 hours to get light burned magnesia (Si: 3.2%, Fe: 0.8%, Al: 0.4%). Then the magnesia is mixed with water. The content of magnesium oxide, Si, Fe, and Al in the slurry is 4.5 wt %, 0.143%, 0.036% and 0.018%, respectively.

The above slurry of magnesium oxide, a raffinate of lanthanum chloride and cerium chloride (1.32 mol/L), and an organic phase of P507 (1.3 mol/L) are added into a 5-stage preextractin tank at the flow speed of 1 L/min, 0.5 L/min and 4 L/min, respecteively, to be concurrent extracted with flow ratio (organic phase/aqueous phase): 4:3.2, temperature in extraction tank: 45° C., mixing time: 40 mins and clarification time: 15 mins. An organic phase loaded with difficult-extracted rear earth lanthanum and cerium is obtained. The content of the rare earth is 0.163 mol/L. And meanwhile, an aqueous raffinate of magnesium chloride, pH 3.5 and content of REO less than 0.006 mol/L, is obtained.

The loaded organic phase containing 0.163 mol/L of lanthanum and cerium is used for fractional extractive separation of mischmetal chloride solution (REO: 1.48 mol/L, Pr: 7.2%) containing La, Ce and Pr. The extraction flow ratio, i.e., organic phase/aqueous phase (volume ratio), is 2.2:1, mixing time is 4 mins, clarification time is 15 mins, and the temperature in the extraction tank is 30° C. A stripping liquor of praseodymium chloride and a raffinate of lanthanum chloride and cerium chloride are obtained after 25 stages of extraction, 28 stages of scrubbing, and 7 stages of countercurrent back extraction by 5 mol/L hydrochloride acid solution and aqueous phase reflux back extraction. $Pr_6O_{11}$/REO, Fe, Al, and Mg in the solution of praseodymium chloride are 99.9%, 5.3 ppm, 52 ppm and 2.8 ppm, respectively. Concentration of REO, Fe and Al in raffinate of lanthanum chloride and cerium chloride is 1.32 mol/L, 3.8 ppm and 2.7 ppm, respectively. Part of the raffinate is used for the preextraction of organic phase, and another part of raffinate is the product or used as raw materials for the separation of pure lanthanum and pure cerium.

After 10 days operation, 7.6 kg of third phase and 20.5 kg of sediment are produced in the preextracton process, and the concentration of Fe in the back extracted organic phase reaches 0.02 mol/L.

Example 2

The dolomite is calcined at 950-1000° C. for 1 hour to get a mixture of Magnesium oxide and Calcium oxide. At 50° C., the mixture is digested by water at liquid/solid ratio of 5:1 (calculated by the weight of water and magnesia and/or calcium oxide) for 5 hours, and thereafter mixed with water at liquid/solid ratio of 190:1 (calculated by the weight of water, magnesia oxide and calcium oxide). Then $CO_2$ gas (30 vt %) is introduced into it at 25° C. and reacted for 2 hours. After clarification and filtration, pure aqueous solution of magnesium bicarbonate and pure aqueous solution of calcium bicarbonate (MgO+CaO: 5.0 g/L, Fe: 1.2 ppm, Al: 0.6 ppm) is obtained.

The solution of magnesium bicarbonate and calcium bicarbonate, a mixed organic phase (1.5 mol/L) of P204(40%) and P507, and a solution of lanthanum nitrate (0.72 mol/L) are added into a 4-stage preextraction tank at the flow speed of 165 L/min, 60 L/min and 15 L/min, respectively, to be concurrent extracted with flow speed (organic phase/aqueous phase): 0.39:1, temperature in the preextraction tank: 20° C., mixing time of single stage: 30 mins, and clarification time: 15 mins. A loaded organic phase with 0.178 mol/L lanthanum ion and an aqueous raffinate with equilibrium pH of 4.5 are obtained.

The loaded organic phase is directly used for fractional extraction of the solution of lanthanum nitrate and cerium nitrate with the metal ionic concentration of 1.0 mol/L. The flow ratio is 4:1 (organic phase: aqueous phase), mixing time of single stage is 5 mins, clarification time is 20 mins, and the temperature in the extraction tank is 30° C. A stripping liquor of cerium nitrate (purity: 99.95%) and a raffinate of lanthanum nitrate (purity 99.9%) are obtained after 48 stages of fractional extraction, and 10 stages of countercurrent and aqueous phase reflux back extraction by 5 mol/L nitric acid solution.

Example 3

Magnesia is digested by water at 95° C. for 0.5 hours and then mixed with water at liquid/solid ratio of 50:1 (calculated by the weight of water and magnesia). Then $CO_2$ gas (90 vt %) is introduced into it at 15° C. and reacted for 3 hours. Pure aqueous solution of magnesium bicarbonate (MgO: 18.2 g/L, Fe: 4.5 ppm, Al: 3.2 ppm) is obtained after clarification and filtration.

The aqueous solution of magnesium bicarbonate, an organic phase of 1.5 mol/L P204, and a solution of 0.1 mol/L cobalt sulfate (comprising 1% nickel) are added into a 4-stage preextraction tank at the flow speed of 34 L/min, 50 L/min and 100 L/min, respectively, to be concurrent extracted with flow ratio: 0.37:1, the temperature in the preextraction tank: 25° C., mixing time of single stage: 9 mins, and clarification time: 20 mins. A loaded organic phase with 0.198 mol/L cobalt ion and an aqueous raffinate of magnesium sulfate with equilibrium pH of 4.5 are obtained.

The loaded organic phase with cobalt ions is countercurrently scrubbed by 0.1 mol/L hydrochloric acid through 5 stages, and back extracted by 2 mol/L hydrochloric acid through 4 stages. The single stage mixing time are 4 mins and the clarification time are 13 mins. A solution of cobalt chloride is obtained. And then 1.25 times of theoretical amount oxalic acid is added to precipitate cobalt so as to get cobalt oxalate. The cobalt oxalate is calcined at 850-900° C. for 2 hours to get cobalt oxide product.

Example 4

Dolomite, marble and calcium carbonate are carbonized at 25° C. by spraying water and introducing $CO_2$ (99 vt %) simultaneously. Pure aqueous solution of calcium bicarbonate (CaO: 11 g/L, Fe: 0.5 ppm, Al: 0.6 ppm) can be obtained after clarification and filtration.

The aqueous solution of calcium bicarbonate, an organic phase of 0.7 mol/L naphthenic acid and a solution of 1.35 mol/L yttrium chloride are added into a preextraction tank at flow speed of 16.2 L/min, 10 L/min and 1.5 L/min, respectively, to be concurrent extracted. The flow ratio is 0.69:1, mixing time of single stage is 10 mins, temperature in the extraction tank is 25° C., and clarification time is 20 mins. Then yttrium-contained organic phase (with 0.20 mol/L REO) and aqueous raffinate of calcium chloride (equilibrium pH value: 5.8) can be obtained simultaneously.

The loaded organic phase is directly used for the extractive separation and purification of rare earth chloride solution (containing 1.45 mol/L REO and comprising yttrium, holmium, erbium, thulium, ytterbium and lutetium). Raffinate that contains 99.9% yttrium oxide and a stripping liquor that contains chlorides of holmium, erbium, thulium, ytterbium and lutetium can be obtained after 70 stages of fractional extraction (flow ratio (loaded organic phase/aqueous phase containing rare earth): 1:1, temperature in tank: 40° C., mixing time of single stage: 5 mins, and clarification time: 20 mins), and 20 stages of contercurrent and aqueous phase reflux back extraction by 5 mol/L hydrochloric acid. The enriched product can be carried out further extractive separation and purification to get single rare earth.

Example 5

The magnesium carbonate is calcined at 750-850° C. for 5 hours to get light burned magnesia. At 80° C., the magnesia is digested by water at liquid/solid ratio of 1:1 (calculated by the weight of water and magnesia) for 5 hours, and thereafter mixed with water at liquid/solid ratio of 40:1 (calculated by the weight of water and magnesia). Then $CO_2$ gas (90 vt %) is introduced into it at 20° C. and reacted for 30 mins Pure aqueous solution of magnesium bicarbonate (MgO: 24 g/L, Fe: 2.1 ppm, Al: 1.2 ppm) is obtained after clarification and filtration.

An organic phase of 1.5 mol/L P204 is added to the first stage mixer settler at a flow speed of 10 L/min, the aqueous solution of magnesium bicarbonate is added to the third stage mixer settler at a flow speed of 5 L/min and a solution of rare earth sulfate containing 0.30 mol/L lanthanum, cerium, praseodymium and Neodymium is added to the fifth stage mixer settler at a flow speed of 6.5 L/min. After 5 stages of countercurrent preextraction (mixing time of single stage: 4 mins, clarification time: 15 mins and temperature in extraction tank: 35° C.) and one stage of clarification, a loaded organic phase that contains lanthanum, cerium, praseodymium and Neodymium can be obtained (the content of REO is 0.193 mol/L). The pH value of the aqueous phase that contains magnesium sulfate is 1.

The loaded organic phase containing lanthanum, cerium, praseodymium and Neodymium is countercurrently and aqueous phase reflux back extracted (8 stages) to get a solution of mixed rare earth nitrate (containing lanthanum, cerium, praseodymium and Neodymium) which is then concentrated and crystallized to get a product of nitrate of lanthanum, cerium, praseodymium and Neodymium with 46 wt % REO.

Example 6

Aqueous solution of magnesium bicarbonate (MgO: 12 g/L) and 0.98 mol/L naphthenic acid are added into the first stage concurrent extraction tank at flow speed of 15.8 L/min and 10 L/min, respectively, and a solution of 0.21 mol/L mixed rare earth sulfate (comprising lanthanum, cerium, praseodymium, neodymium, samarium, europium, gadolinium, terbium, dysprosium, etc.) to the tenth countercurrent extraction tank. After five stages of concurrent and ten stages of countercunrrent preextraction (flow ratio (organic phase: aqueous phase): 0.33:1, mixing time of single stage in concurrent extraction: 10 mins, mixing time of single stage in countercurrent extraction: 3 mins, clarification time: 15 mins, and the temperature in the extraction tank: 50° C.), a loaded organic phase containing rare earth is obtained, the content of REO is 0.30 mol/L. Meanwhile, an aqueous raffinate of magnesium sulfate is obtained (equilibrium pH value: 5.5).

The loaded organic phase is countercurrently scrubbed by 0.1 mol/L hydrochloric acid (3 stages) and then countercurrently and aqueous phase reflux back extracted (5 stages) to get a solution of 1.65 mol/L mixed rare earth chloride which is then concentrated and crystallized to get a mixed rare earth product (content of REO: 46 wt %).

Example 7

176 L of aqueous solution of calcium bicarbonate (CaO: 100 g/L, Fe: 2.5 ppm, Al: 1.6 ppm), 1000 L of 0.8 mol/L fatty acid and 126 L of solution of 1.6 mol/L samarium chloride are added into extraction tank for single stage extraction. The phase ratio is 3.3:1, mixing time is 30 mins, temperature in tank is 25° C., and clarification time is 60 mins. A loaded organic phase containing rare earth (the content of the rare earth is 0.20 mol/L) is obtained, as well as an aqueous raffinate of calcium chloride with equilibrium pH vale of 5.2.

The loaded organic phase is directly countercurrently back extracted by 4.5 mol/L nitric acid (6 stages) to get a solution of 1.36 mol/L samarium nitrate which is then concentrated and crystallized to get a samarium nitrate product (content of REO is 45 wt %).

Example 8

An aqueous solution of magnesium bicarbonate (MgO: 15.6 g/L, Fe: 1.5 ppm, Al: 0.6 ppm), a mixed organic phase of 1.3 mol/L P507 and C272 (P507: 70 vt %) and a solution of thulium chloride (1.26 mol/L) are added into a 4-stage preextraction tank for concurrent extraction at flow speed of 3.4 L/min, 5.6 L/min and 0.68 L/min, respectively. The flow ratio is 1.44:1, mixing time of single stage is 4 mins, the temperature in the tank is 30° C., and the clarification time is 15 mins. Then a loaded organic phase containing thulium and ytterbium is obtained, as well as an aqueous raffinate of magnesium chloride with equilibrium pH value of 2.

The loaded organic phase containing thulium and ytterbium (REO: 0.152 mol/L) is directly used for extractive separation and purification of a solution of thulium, ytterbium and lutetium chloride (1.35 mol/L) by 56-stage fractional extraction with flow ratio of 10:1; it is then countercurrently and aqueous phase reflux back extracted by hydrochloride acid (15 stages). The phase ratio (organic phase: aqueous phase) is 2:1, mixing time of single stage is 5 mins, clarification time is 15 mins, and the temperature in the tank is 45° C. Then a raffinate of thulium and ytterbium chloride and a stripping liquor of 99.9% lutetium chloride is obtained.

286 kg of calcium hydroxide (CaO 75%) is added into 10 $M^3$ of the obtained solution of magnesium chloride (MgO: 12.8 g/L). The reaction lasts at 25° C. under stirring for 120 mins to get a slurry of magnesium hydroxide. The $CO_2$ released from the preextraction process is introduced into the slurry under stirring for 2-hour carbonization. Solution of pure magnesium bicarbonate can be obtained after filtration, and then returned for the preextraction.

Example 9

An aqueous solution of calcium bicarbonate (CaO: 25.5 g/L, Fe: 1.5 ppm, Al: 0.8 ppm) saturated with carbon dioxide and an organic phase of P507 (1.5 mol/L) are added into a 3-stage preextraction tank for concurrent extraction at the flow speed of 7.5 L/min and 10 L/min, respectively, with flow ratio of 1.33:1, to get a loaded organic phase whose calcium content is 0.33 mol/L, and a wastewater whose pH is 5. And then a praseodymium chloride solution (1.86 mol/L) is added into the loaded organic phase containing calcium ions for 4-stage countercurrent extraction at the flow speed: 1.0 L/min, with flow ratio: 10:1, mixing time of single stage: 4 mins, and clarification time: 15 mins, to get a loaded organic phase with praseodymium ions (REO 0.185 mol/L) and an aqueous raffinate of calcium chloride with equilibrium pH 4.

The loaded organic phase containing praseodymium (REO 0.185 mol/L) is directly used for extractive separation and purification of a solution of praseodymium chloride and neodymium chloride (2.0 mol/L, Pr: 20%). 150-stage fractional extraction is used, with flow ratio of 9:1, and then a raffinate of 99.9% praseodymium chloride and stripping liquor of 99.95% neodymium chloride are obtained as products after 12 stages of countercurrent back extraction by 5.5 mol/L hydrochloride solution and aqueous phase reflux back extraction, during which the mixed flow ratio is 3:1, mixing time of single stage is 5 mins, clarification time is 15 mins, and the temperature in the extraction tank is 35° C.

Example 10

An aqueous solution of magnesium bicarbonate (MgO: 20.5 g/L, Fe: 1.2 ppm, Al: 0.8 ppm) and an organic phase of P204 (1.5 mol/L) are added into a 2-stages preextraction tank for concurrent extraction at the flow speed of 6.2 L/min and 10 L/min, respectively, with flow ratio of 1.6:1, to get a loaded organic phase with magnesium content of 0.3 mol/L and a wastewater with pH 4.5. And then a cerium chloride solution (1.56 mol/L) is added into the loaded organic phase containing magnesium for 4-stages countercurrent extraction at the flow speed: 1.16 L/min, with flow ratio: 8.6:1, mixing time of single stage: 4 mins, and clarification time: 15 mins, to get a loaded organic phase with cerium (REO 0.18 mol/L) and an aqueous raffinate of magnesium chloride with equilibrium pH 2.5.

The loaded organic phase containing cerium (REO 0.18 mol/L) is directly used for extractive separation and purification of a solution of cerium chloride and praseodymium chloride (1.67 mol/L, $Pr_6O_{11}$ 26%). 60 stage fractional extraction (32 stages of extraction, 28 stages of scrubbing) is used, with flow ratio of 8:1. And then a raffinate of 99.5% cerium chloride and a stripping liquor of 99.95% praseodymium chloride are obtained as products by 10 stages of countercurrent back extraction by 5.5 mol/L hydrochloride solution and aqueous phase reflux back extraction, during which the mixed flow ratio is 4:1, mixing time of single stage is 5 mins, clarification time is 15 mins, and the temperature in the extraction tank is 35° C.

The obtained 2.5M³ solution of magnesium chloride (MgO: 103 g/L, 2.58 mol/L) is added into the mixture of calcium hydroxide (67%) and magnesium hydroxide (33%) obtained from digestion of 750 kg light burned dolomite and then stirred at 55° C. for 60 minutes, magnesium hydroxide cake is obtained after filtration. The magnesium hydroxide cake is mixed with water at liquid to solid ratio of 45:1 (calculated by the weight of water and magnesia), and then carbon dioxide gas (90 vt %) is introduced into it under stirring for a 1-hour carbonization reaction at 20° C. After filtration, a pure aqueous solution of magnesium bicarbonate with magnesia content of 20.5 g/L is obtained, and then returned to the preextraction process.

Example 11

Magnesium hydroxide is diluted by the wastewater generated from Example 9 with pH 5 at liquid to solid ratio of 60:1 (calculated by the weight of water and magnesia). And then carbon dioxide gas (90 vt %) is introduced into it to react for 5 hours at 0° C. Pure aqueous solution of magnesium bicarbonate (MgO: 15.2 g/L, Fe: 0.8 ppm, Al: 1.6 ppm) is obtained after clarification and filtration.

The above said aqueous solution of magnesium bicarbonate (MgO: 15.2 g/L), organic phase of P204 (0.5 mol/L) and a solution of aluminum sulfate (0.25 mol/L) are added into a preextraction tank for 3-stages concurrent extraction with mixing time: 30 mins, clarification time: 20 mins, temperature in preextraction tank: 45° C., to get a loaded organic phase containing aluminum with content of 0.06 mol/L and an aqueous raffinate of magnesium sulfate.

The loaded organic phase containing aluminum ion is directly used for extractive separation and purification of aluminum sulfate solution comprising iron (Fe molar ratio is 3.5%) having metal ion concentration of 0.3 mol/L, with flow ratio of organic phase to aqueous phase: 1:3, mixing time of single stage: 5 mins, clarification time 15 mins, the temperature in the extraction tank 35° C.; and then a raffinate of aluminum sulfate is obtained as product after 6 stages of extraction and 4 stages of scrubbing by 0.5 mol/L dilute sulfuric acid, wherein the content of iron is less than 20 ppm.

Example 12

Magnesium chloride solution (5.0 mol/L, MgO 200 g/L) is added into 30% sodium hydroxide solution by Na/Mg molar ratio of 1 for a 25 minutes reaction at 20° C., to get magnesium hydroxide slurry which is then filtered to get magnesium hydroxide cake. The magnesium hydroxide cake is mixed with water at liquid to solid ratio of 30:1 (calculated by the weight of water and magnesia), and then carbon dioxide gas is introduced into it to carbonize continuously at 25° C. Aqueous solution of magnesium bicarbonate (MgO: 30 g/L, Fe: 0.3 ppm, Al: 0.4 ppm) is obtained after filtration.

The above said aqueous solution of magnesium bicarbonate (MgO: 30 g/L), organic phase of P204 (1.0 mol/L) and a solution of aluminum sulfate (0.18 mol/L) are added into a preextraction tank for 3-stages concurrent extraction with mixing time: 30 mins, clarification time: 20 mins, temperature in preextraction tank: 45° C., to get a loaded organic phase containing aluminum with content of 0.12 mol/L and an aqueous raffinate of magnesium sulfate.

The loaded organic phase containing aluminum ion is directly used for extractive separation and purification of vanadium sulfate solution comprising aluminum (Al: 10.5%) having metal ion concentration of 0.2 mol/L, with flow ratio of organic phase to aqueous phase of 1:1, mixing time of single stage 5 mins, clarification time 15 mins, the temperature in the extraction tank 40° C.; and then sodium metavanadate is obtained as product after 6 stages of extraction, 6 stages of scrubbing by 0.5 mol/L dilute sulfuric acid and 10 stages of back extraction by 2 mol/L sodium hydroxide, wherein the content of aluminum is less than 10 ppm.

Example 13

The calcium oxide powder is digested by water at liquid to solid ratio of 2.5:1 (calculated by the weight of water and calcium oxide) for 60 mins at 80° C. to get calcium hydroxide slurry, and then brine is added by Ca/Mg molar ratio of 1.2:1 for a 60 minutes reaction at 25° C. to get magnesium hydroxide slurry which is then filtered to get magnesium hydroxide cake. The magnesium hydroxide cake is mixed with water at liquid to solid ratio of 50:1 (calculated by the weight of water and magnesia), and then carbon dioxide gas is introduced into it to carbonize continuously at 20° C. Aqueous solution of magnesium bicarbonate (MgO: 18.6 g/L, Fe: 1.7 ppm, Al: 0.3 ppm) is obtained after filtration.

The above said aqueous solution of magnesium bicarbonate (MgO: 18.6 g/L), an organic phase of P204 (1.0 mol/L) and a solution of copper sulfate (0.22 mol/L) are added into a preextraction tank for 4-stages concurrent extraction with mixing time: 30 mins, clarification time: 30 mins, temperature in preextraction tank: 35° C., to get a loaded organic phase containing copper with content of 0.11 mol/L and an aqueous raffinate of magnesium sulfate.

The loaded organic phase containing copper ion is directly used for extractive separation and purification of copper sulfate solution containing zinc (Zn molar ratio of 26.5%) having metal ion concentration of 0.3 mol/L, with flow ratio of organic phase to aqueous phase: 2:1, mixing time of single stage 5 mins, clarification time 15 mins, the temperature in the extraction tank 30° C.; and then raffinate of 99.9% copper sulfate and stripping liquor of 99.95% zinc chloride are obtained as products after 8 stages of extraction, 7 stages of scrubbing by 0.3 mol/L dilute sulfuric acid and 6 stages of back extraction by 4 mol/L hydrochloride solution.

Example 14

The calcium oxide powder is digested by water at liquid to solid ratio of 2.5:1 (calculated by the weight of water and calcium oxide) for 60 mins at 80° C. to get calcium hydroxide slurry, and then brine is added by Ca/Mg molar ratio of 1.2:1 for a 60 mins reaction at 25° C. to get magnesium hydroxide slurry which is then filtered to get magnesium hydroxide cake. The magnesium hydroxide cake is mixed with water at liquid to solid ratio of 60:1 (calculated by the weight of water and magnesia), and then carbon dioxide gas is introduced into it to carbonize continuously at 20° C. Aqueous solution of magnesium bicarbonate (MgO: 18.6 g/L, Fe: 1.7 ppm, Al: 0.3 ppm) is obtained after filtration.

The above said aqueous solution of magnesium bicarbonate (MgO: 18.6 g/L), an organic phase of P204 (1.0 mol/L) and a solution of copper sulfate (0.25 mol/L) are added into a preextraction tank for 4-stages concurrent extraction with mixing time: 30 mins, clarification time: 30 mins, temperature in preextraction tank: 35° C., to get a loaded organic phase containing copper with content of 0.11 mol/L and an aqueous raffinate of magnesium sulfate.

The loaded organic phase containing copper ion is directly used for extractive separation and purification of copper sulfate solution containing zinc (Zn molar ratio of 26.5%) having metal ion concentration of 0.3 mol/L, with flow ratio of organic phase to aqueous phase of 2:1, mixing time of single stage 5 mins, clarification time 15 mins, the temperature in the extraction tank 30° C.; and then a raffinate of 99.9% copper sulfate and a stripping liquor of 99.95% zinc chloride are obtained as products after 8 stages of extraction, 7 stages of scrubbing by 0.3 mol/L dilute sulfuric acid and 6 stages of back extraction by 4 mol/L hydrochloride solution.

Example 15

The aqueous solution of magnesium bicarbonate (MgO: 20.5 g/L, Fe: 1.2 ppm, Al: 0.8 ppm) saturated with carbon dioxide and an organic phase of P204 (1.5 mol/L) are added into a 2-stages preextraction tank at the flow speed of 6.2 L/min and 10 L/min, respectively, for concurrent extraction with flow ratio of 1.6:1, to get a loaded organic phase with magnesium content of 0.3 mol/L and a wastewater with pH 4.5; and then a lanthanum and cerium sulfate solution (0.31 mol/L) is added into the loaded organic phase containing magnesium for 4-stages countercurrent extraction at the flow speed of 6 L/min, with flow ratio: 0.82:1, mixing time of single stage: 4 mins, and clarification time: 15 mins, to get a loaded organic phase containing lanthanum and cerium (REO 0.185 mol/L) and an aqueous raffinate of magnesium sulfate with equilibrium pH 2.0.

1.36 mol/L lanthanum and cerium nitrate solution is obtained after 6 stages of countercurrent back extraction by 4.5 mol/L nitric acid from the loaded organic phase directly, and then concentrated and crystallized to obtain lanthanum and cerium nitrate product (REO 45 wt %).

The invention claimed is:

1. A method of extractive separation and purification of metals, comprising the following steps:
    (1) an acidic organic extractant as an organic phase and a magnesium bicarbonate and/or calcium bicarbonate aqueous solution as an aqueous phase are added into an extraction tank simultaneously, and then an extraction is realized in a single or multiple stage concurrent and/or countercurrent way, thereby magnesium ions and/or calcium ions from the magnesium bicarbonate and/or calcium bicarbonate are exchanged with hydrogen ions in the organic phase, an equilibrium pH value of the aqueous phase is 3-5, after clarification and phase separation, a magnesium and/or calcium ions-containing organic phase and a wastewater solution are obtained; then the magnesium and/or calcium ions-contained organic phase is mixed with a solution containing the metals to be separated and purified to obtain a mixture, the mixture is pre-extracted in a single stage or multiple stage concurrent and/or countercurrent way, thereby metal ions from the metals are extracted into an organic phase, after clarification and phase separation, an organic phase loaded with metal ions as well as an aqueous raffinate containing magnesium and/or calcium ions are obtained, an equilibrium pH value of the aqueous phase is 2.5-4.5;
    (2) the organic phase loaded with metal ions obtained by step (1) is used for the extractive separation and purification of a metal solution containing two or more species of metal ions which includes the metal ions contained in the organic phase, after multi-stage extraction, scrubbing and stripping process, then a raffinate, a scrubbing liquor and a stripping liquor with metal ions are obtained, wherein the metal ions in the raffinate, the scrubbing liquor and the stripping liquor are different from each other;
    alternatively, the obtained organic phase loaded with metal ions is stripped directly by acid or alkali solution to obtain a purified metal solution or slurry; then the purified metal solution is used to produce metal compounds product by concentrating crystallization or precipitation, or to produce single metal compound product by further extractive separation and purification, while the slurry is filtrated to produce compound product.

2. The method of claim 1, wherein said metal ions contained in the organic phase are at least one selected from the group consisting of lanthanum, cerium, praseodymium, neodymium, samarium, europium, gadolinium, terbium, dysprosium, holmium, erbium, thulium, ytterbium, lutetium, yttrium, nickel, cobalt, iron, manganese, chromium, aluminum, vanadium, copper and zinc.

3. The method of claim 1, wherein said metal ions contained in the organic phase are at least one selected from the group consisting of lanthanum, cerium, praseodymium, neodymium, samarium, europium, gadolinium, terbium, dysprosium, holmium, erbium, thulium, ytterbium, lutetium and yttrium.

4. The method of claim 1, wherein said acidic organic extractant is one or more species elected from acidic phosphorous extractants and carboxylic acid extractants, wherein the extractant is diluted by organic solvent, and a concentration of the extractant is 0.5~2.0 mol/L.

5. The method of claim 4, wherein the said acidic organic extractant comprises one or more species selected from the group consisting of 2-ethylhexyl 2-ethylhexyl phosphate, di-(2-ethylhexyl)phosphoric acid, bis-(2-ethylhexyl)phosphoric acid, di(2,4,4-trimethylpentyl)phosphinic acid, bis(2,4,4-trimethylpentyl) dithiophosphinic acid, bis(2,4,4-trimethylpentyl) monothiophosphinic acid, fatty acid, naphthenic acid and heterogeneous acid.

6. The method of claim 1, wherein a content of magnesium oxide and/or calcium oxide in said magnesium bicarbonate and/or calcium bicarbonate aqueous solution is 5~100 g/L, and a content of iron and aluminum in the same are less than 5 ppm, respectively.

7. The method of claim 1, wherein a content of magnesium oxide and/or calcium oxide in said magnesium bicarbonate and/or calcium bicarbonate aqueous solution is 5~30 g/L, and a content of iron and aluminum in the same are less than 2 ppm, respectively.

8. The method of claim 1, wherein single or 2-20 stages concurrent and/or countercurrent extraction is used in said extraction of step (1), during which a volume flow ratio or phase ratio of the organic phase to aqueous phase is 0.2-10:1 (O/A), a single stage mixing time is 3~30 minutes, clarifying time is 5~60 minutes, a temperature in the extraction tank is 20~50° C., a total concentration of metal ions in the loaded organic phase is 0.05~0.3 mol/L and an equilibrium pH value of the raffinate aqueous phase containing magnesium or/and calcium ions is 2.5~4.5.

9. The method of claim 1, wherein during said step (1), 1 to 1.5 mol/L acidic extractant and magnesium bicarbonate and/or calcium bicarbonate aqueous solution saturated with carbon dioxide are mixed, and then realized extraction in a single stage or 2~10 stages concurrent and/or countercurrent way, during which a volume ratio of the organic phase to aqueous phase (O/A) is 0.2~10:1, a single stage mixing time is 3~30 minutes and clarifying time is 5~30 minutes, whereby an organic phase loaded with 0.15 to 0.35 mol/L magnesium and/or calcium ions and a wastewater with pH 3-5 are obtained; then an extractive reaction between the organic phase loaded with magnesium and/or calcium ions and a 0.1~2.0 mol/L metal solution is carried out by single stage or 2~10 stages concurrent and/or countercurrent extraction, during which a volume ratio of the organic phase to aqueous phase (O/A) is 0.2~10:1, a single stage mixing time is 3~30 minutes and a clarifying time is 5~30 minutes, thereby an organic phase loaded with 0.1~0.2 mol/L metal ions and an aqueous raffinate containing magnesium or/and calcium ions with pH value 2.5~4.5 are obtained; wherein the 0.1~2.0 mol/L metal solution is the raffinate obtained from the extractive separation and purification process of said step (2), and a temperature in the extraction tank is controlled at 20~50° C.

10. The method of claim 1, wherein during the process that said loaded organic phase of step (2) is used in the extractive separation and purification of the metal solution containing 2 or more species of metal ions, a fractional extraction of 10~150 stages is used, 3~20 stages countercurrent or/and reflux measure is used for stripping, a volume ratio of the organic phase to aqueous phase (O/A) is 0.1~10:1, a single stage mixing time is 3~20 minutes, clarifying time is 5~30 minutes, and a temperature in the extraction tank is controlled at 20~80° C.

11. The method of claim 1, wherein said metal solution is a chloride solution, a nitrate solution, a sulfate solution or a mixture thereof, with a metal concentration of 0.1~1.8 mol/L.

12. The method of claim 1, wherein carbon dioxide released from said reaction between the acidic organic extractant and the aqueous solution of magnesium bicarbonate and/or calcium bicarbonate is collected and recycled for preparation of the aqueous solution of magnesium bicarbonate and/or calcium bicarbonate.

13. The method of claim 1, further comprising preparing said aqueous solution of magnesium bicarbonate and/or calcium bicarbonate by roasting, hydrating and carbonating a mineral comprising magnesium and/or calcium.

14. The method of claim 13, wherein said aqueous solution of magnesium bicarbonate and/or calcium bicarbonate is prepared by roasting, hydrating and carbonating at least one mineral selected from the group consisting of magnesite, dolomite, and magnesium carbonate.

15. The method of claim 13, wherein said roasting process is that the mineral is roasted for 1-5 hours at 700~1000° C.; said hydrating process is that water is added into the magnesium oxide and/or calcium oxide obtained from the roasting process to hydrate at 50~95° C. for 0.5~5 hours at a weight ratio of the liquid to solid 1~5:1, calculated by a weight of water and magnesium oxide and/or calcium oxide, and then water is added to produce slurry at a weight ratio of the liquid to solid 10~200:1, calculated by weight of water and magnesium oxide and/or calcium oxide; and a carbonating process wherein the slurry is carbonated by carbon dioxide after hydration, with reaction temperature controlled at 0~50° C. and reaction time 0.1~5 hours, after filtration a pure solution of magnesium bicarbonate and/or calcium bicarbonate is obtained.

16. The method of claim 1, further comprising preparing said aqueous solution of magnesium bicarbonate by:
  adding water into magnesium oxide to hydrate at 50~95° C. for 0.5~5 hours at a weight ratio of the liquid to solid 1~5:1 calculated by a weight of water and magnesium oxide, or
  adding water into magnesium hydroxide to produce a slurry at a weight ratio of the liquid to solid 10~200:1, calculated by weight of water and magnesium oxide;
  then introducing carbon dioxide for carbonation, with reaction temperature controlled at 0~50° C. and reaction time 0.1~5 hour, after filtration, pure solution of magnesium bicarbonate is obtained.

17. The method of claim 1, further comprising preparing said aqueous solution of magnesium bicarbonate wherein a magnesium salt is used as raw material, and the specific steps are:
  (1) preparation of magnesium hydroxide: a magnesium salt solution or solid magnesium salt is dissolved in water, then liquid or solid alkaline compound whose alkalinity is stronger than that of magnesium hydroxide is added, after reaction, a magnesium hydroxide slurry is obtained, or a magnesium hydroxide cake is obtained by filtration;
  (2) preparation of a solution of magnesium bicarbonate: the magnesium hydroxide slurry or the magnesium hydroxide cake obtained from step (1) is mixed with water to form slurry and then carbonated by introducing carbon dioxide to generate a solution of magnesium bicarbonate.

18. The method of claim 17, wherein said magnesium salt in step (1) is at least one selected from magnesium chloride and magnesium nitrate.

19. The method of claim 17, wherein said magnesium salt solution in step (1) is at least one selected from an aqueous solution containing magnesium chloride, an aqueous solution containing magnesium nitrate, brine and seawater; and a concentration of said magnesium salt solution is 10~300 g/L calculated by magnesium oxide.

20. The method of claim 17, wherein a concentration of said magnesium salt solution is 10~200 g/L calculated by magnesium oxide.

21. The method of claim 17, wherein said alkaline compound in step (1) is at least one selected from the group consisting of calcium hydroxide, sodium hydroxide, potassium hydroxide, calcium hydroxide obtained from hydration of calcium oxide and a mixture of calcium hydroxide and magnesium hydroxide obtained from hydration of light-burned dolomite.

22. The method of claim 17, wherein said alkaline compound in step (1) is calcium hydroxide obtained from hydration of calcium oxide or a mixture of calcium hydroxide and magnesium hydroxide obtained from hydration of light-burned dolomite.

23. The method of claim 17, wherein an amount of said alkaline compound added in step (1) is 1~1.5 times of a stoichiometric amount, a reaction temperature is 15~95° C., and a reaction time is 10~180 minutes.

24. The method of claim 17, wherein during said process of mixing water with the magnesium hydroxide slurry or magnesium hydroxide cake to form slurry, a weight ratio of the liquid to solid is 10~200:1 calculated by weight of water and magnesium oxide; and in said process of carbonation by introducing carbon dioxide, a reaction temperature is controlled at 0~35° C., and then pure aqueous solution of magnesium bicarbonate with 5~30 g/L MgO is obtained by filtration.

25. The method of claim 1, further comprising preparing said aqueous solution of calcium bicarbonate wherein at least one selected from the group consisting of calcium carbonate, limestone, marble and dolomite is sprayed with water and carbonated by introducing carbon dioxide, to obtain pure aqueous solution of calcium bicarbonate.

\* \* \* \* \*